United States Patent
Spradling et al.

(10) Patent No.: US 11,351,609 B2
(45) Date of Patent: Jun. 7, 2022

(54) SYNTHESIS OF TUNGSTEN TETRABORIDE

(71) Applicant: Millennitek, LLC, Knoxville, TN (US)

(72) Inventors: Andrew M. Spradling, Knoxville, TN (US); Lawrence W. Townsend, Knoxville, TN (US)

(73) Assignee: Millennitek LLC, Knoxville, TN (US)

(*) Notice: Subject to any disclaimer, the term of this patent is extended or adjusted under 35 U.S.C. 154(b) by 156 days.

(21) Appl. No.: 16/947,015

(22) Filed: Jul. 15, 2020

(65) Prior Publication Data

US 2022/0016702 A1    Jan. 20, 2022

(51) Int. Cl.

| | |
|---|---|
| B22F 9/04 | (2006.01) |
| B22F 3/12 | (2006.01) |
| C01B 35/04 | (2006.01) |
| C22C 29/14 | (2006.01) |
| C22C 1/05 | (2006.01) |
| G21F 1/06 | (2006.01) |
| G21F 1/08 | (2006.01) |
| C04B 35/58 | (2006.01) |
| G21C 11/02 | (2006.01) |

(52) U.S. Cl.
CPC .............. *B22F 9/04* (2013.01); *B22F 3/12* (2013.01); *C01B 35/04* (2013.01); *C22C 1/051* (2013.01); *C22C 29/14* (2013.01); *G21F 1/06* (2013.01); *G21F 1/085* (2013.01); *B22F 2009/041* (2013.01); *B22F 2201/11* (2013.01); *B22F 2201/20* (2013.01); *B22F 2202/13* (2013.01); *B22F 2302/05* (2013.01); *C04B 35/58064* (2013.01); *G21C 11/028* (2013.01)

(58) Field of Classification Search
CPC .............. B22F 3/12; B22F 3/16; C01B 35/04
See application file for complete search history.

(56) References Cited

U.S. PATENT DOCUMENTS

| | | |
|---|---|---|
| 7,645,308 B2 | 1/2010 | Kaner et al. |
| 8,431,102 B2 | 4/2013 | Kaner et al. |
| 9,281,153 B1 | 3/2016 | Wedding |
| 10,125,412 B2 | 11/2018 | Kaner et al. |
| 2014/0041313 A1 | 2/2014 | Kaner et al. |
| 2017/0209983 A1* | 7/2017 | Kavanaugh ........ B24D 18/0009 |

(Continued)

FOREIGN PATENT DOCUMENTS

| | | | |
|---|---|---|---|
| CN | 102001674 A | * | 4/2011 |
| CN | 102285661 A | * | 12/2011 |

(Continued)

OTHER PUBLICATIONS

Nukem Isotopes, Boron-10 in the form of Boric Acid; retrieved from the web on Jan. 22, 2022; https://nukem-isotopes.de/project/boric-acid/ ; Jan. 17, 2018 (Year: 2018).*

(Continued)

*Primary Examiner* — Kevin E Yoon
*Assistant Examiner* — Austin Pollock
(74) *Attorney, Agent, or Firm* — Luedeka Neely Group, P.C.; Rick Barnes

(57) ABSTRACT

A method of forming tungsten tetraboride, by combining tungsten and boron in a molar ratio of from about 1:6 to about 1:12, respectively, and firing the combined tungsten and boron in the hexagonal boron nitride crucible at a temperature of from about 1600 C to about 2000 C, to form tungsten tetraboride.

19 Claims, 2 Drawing Sheets

(56) References Cited

U.S. PATENT DOCUMENTS

| | | | |
|---|---|---|---|
| 2019/0017154 A1* | 1/2019 | Kaner | B22F 9/04 |
| 2019/0135646 A1* | 5/2019 | Turner | C04B 35/645 |
| 2020/0176142 A1* | 6/2020 | Marshall | C22C 38/32 |

FOREIGN PATENT DOCUMENTS

| | | | | |
|---|---|---|---|---|
| CN | 105692641 A | * | 6/2016 | C01B 35/04 |
| CN | 106116593 A | * | 11/2016 | C04B 35/58064 |
| CN | 108424146 A | * | 8/2018 | C04B 35/58064 |
| WO | 2020027688 A1 | | 2/2020 | |
| WO | WO-2021247981 A | * | 12/2021 | |

OTHER PUBLICATIONS

Bodrova L.G.; et al.; Theory, Production Technology, and Properties of Powders and Fibers; Institute of Materials Science; 1972 (Year: 1972).*

Ma K., et al.; "Formation of metastable tungsten tetraboride by reactive hot-pressing"; Ceramics International; 43, 2017, p. 8551-8555 (Year: 2017).*

Ma K., et al.; "In situ synthesis, mechanical properties, and microstructure of reactively hot pressed WB4 ceramic with Ni as a sintering additive"; Ceramics International; 44, 2018, p. 19442-19450 (Year: 2018).*

Long Y., et al.; "Mechanochemical synthesis and annealing of tungsten di and tetra-boride"; J. of American Ceramic Society; 103, p. 831-838 (Year: 2019).*

Lech A.; Synthesis, Structure, and Properties of Refractory Hard-Metal Borides, UCLA Thesis (Year: 2014).*

* cited by examiner

| Trial | Materials | Temp | Container | Crystalline Phase % | | | |
|---|---|---|---|---|---|---|---|
| | | | | WB4 | WB2 | B4C | C |
| 1 | WO3, H3BO3, carbon black | 2000 | Graphite | 0 | 73 | 27 | 0 |
| 2 | WO3, H3BO3, carbon black | 2000 | Graphite | 0 | 81 | 19 | 0 |
| 3 | WO3, H3BO3, carbon black | 2000 | Graphite | 0 | 83 | 17 | 0 |
| 4 | WO2, B4C | 2240 | Graphite | 0 | 74 | 26 | 0 |
| 5 | WO2, B4C | 2240 | Graphite | 0 | 76 | 21 | 3 |
| 6 | W, B | 2240 | Graphite | 0 | 70 | 27 | 3 |
| 7 | W, B | 1800 | Graphite | 0 | 95 | 4 | 1 |
| 8 | W, B | 1800 | BN | 100 | 0 | 0 | 0 |
| 9 | W, B at 1:6 molar ratio | 1800 | BN | 74 | 26 | 0 | 0 |
| 10 | WO2, H3BO3, C at 1:6 molar ratio | 1800 | BN | 95 | 5 | 0 | 0 |
| 11 | W, 10B enriched, at 1:9 | 1800 | BN | 100 | 0 | 0 | 0 |
| 12 | W, 10B enriched, at 1:9 | 1800 | BN | 100 | 0 | 0 | 0 |

Fig. 2

SYNTHESIS OF TUNGSTEN TETRABORIDE

FIELD

The invention described in this disclosure arose in the performance of contract 80NSSC19 C0573 with the NASA Shared Services Center. The United States government has certain rights in the invention.

This invention relates to the field of material synthesis. More particularly, this invention relates to forming tungsten tetraboride radiation shielding.

INTRODUCTION

A primary goal of NASA is to establish a human presence on the moon and to utilize this lunar base as the starting point for longer reach missions such as to Mars. Power generation for lunar bases, rovers, mining operations to produce rocket fuel, and other mission needs must be developed for sustainment of these long-duration critical needs without frequent re-fueling. One promising technology is the development of micro-scale nuclear fission to generate power in the kilowatt-scale range that can operate for years or even decades without refueling. NASA's Kilopower Project is being developed for this purpose, but generates significant neutron and gamma radiation and necessitates that shielding be integrated into the reactor design to protect the electronics and humans that may be in close proximity to the power generation. Current Kilopower shielding designs constitute more than half of the mass of the entire system, thus advances are sought that can lower this mass requirement.

SUMMARY

The above and other needs are met by a method of forming tungsten tetraboride, by combining tungsten and boron in a molar ratio of from about 1:6 to about 1:12, respectively, and firing the combined tungsten and boron in the hexagonal boron nitride crucible at a temperature of from about 1600 C to about 2000 C, to form tungsten tetraboride.

In some embodiments, the molar ratio is about 1:9. In some embodiments, the temperature is about 1800 C. In some embodiments, the firing is accomplished at about one atmosphere. In some embodiments, the firing is accomplished in an argon environment. In some embodiments, the tungsten is provided as tungsten oxide. In some embodiments, the boron is provided as boric acid. In some embodiments, the tungsten is provided as tungsten metal. In some embodiments, the boron is provided as boron metal. In some embodiments, the tungsten and the boron are combined with carbon in the crucible. In some embodiments, the boron is provided as $^{10}B$ enriched boron. In some embodiments, the tungsten tetraboride is milled to a powder, compressed into a desired shape, and the desired shape is sintered.

According to another aspect of the invention there is described a method of forming tungsten tetraboride into a desired shape. According to yet another aspect of the invention there is described a method of forming tungsten tetraboride into a fission reactor shield.

DRAWINGS

Further advantages of the invention are apparent by reference to the detailed description when considered in conjunction with the figures, which are not to scale so as to more clearly show the details, wherein like reference numbers indicate like elements throughout the several views, and wherein:

FIG. 2 is a summary of the various processing parameters that were used to produce materials according to various embodiments of the present invention.

DESCRIPTION

Figure 1:
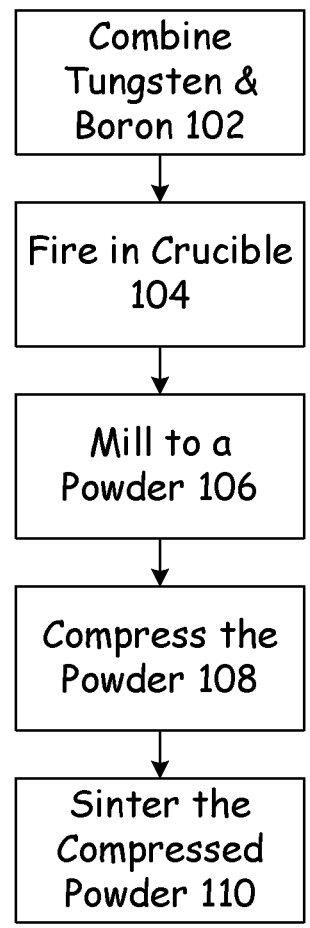
FIG. 1 is a flow chart for a method for making tungsten tetraboride according to an embodiment of the present invention.

With reference now to FIG. 1, there is described a general procedure 100 for preparing tungsten tetraboride according to the embodiments herein. The raw tungsten and boron powders are combined as given in block 102. In some embodiments, a 1:12 W:B molar ratio is combined in a nylon jar mill with acetone and 8YSZ cylindrical milling media for about twelve hours. The slurry is allowed to dry overnight. The mixture is placed into a high purity graphite or boron nitride crucible and processed in a continuous furnace under argon atmosphere at ambient pressure and at temperatures of from about 1800 C to about 2240 C, as given in block 104. The resulting synthesized material is then ball-milled in acetone to a particle size of from about one micron to about three microns and then again allowed to dry, as given in block 106. X-ray diffraction is used to identify and quantify the crystal phases present in the various synthesis batches.

In FIG. 2, there is presented a summary of the raw materials, synthesis conditions, and resulting quantitative crystal phases for the various trials that were conducted. In Trials 1-7, no $WB_4$ phases were formed, with the primary phase being $WB_2$, with minor phases of $B_4C$ and carbon. It is believed that the presence of carbon from the graphite containment crucibles was causing the $WB_2$ to be thermodynamically favored. Performing the synthesis in a high purity hexagonal boron nitride (hBN) crucible resulted in a 100% phase-pure $WB_4$ at a temperature of about 1800 C, using ambient pressure argon atmosphere. The Trial 8 synthesis was repeated and the same result was achieved.

From this point, the W:B molar ratio and synthesis temperature was investigated to determine the point at which the least amount of additional boron and the lowest temperature resulted in phase pure $WB_4$. Trials 9 and 10 were synthesized at molar ratios of 1:6, and at two temperatures—about 1600 C and about 1800 C. Using boric acid was shown to produce nearly phase pure $WB_4$ at about 1800 C. A synthesis temperature of about 1600 C was too low to produce 100% $WB_4$, whether boron metal or boric acid was used as the boron source. Trial 11 was synthesized at about 1:9 molar ratio and about 1800 C, and resulted in 100% phase pure $WB_4$.

$^{10}B$ enriched boron, in the form of greater than 96 atomic weight percent $^{10}B$ boron metal powder, was used in Trials 11 and 12. $^{10}B$ metal powder, although available commercially, is very expensive. However, the phase-pure $WB_4$ can be synthesized using much-less expensive $^{10}B$ enriched boric acid in hBN crucibles.

After the powder synthesis experiments, various trials were complete to form dense compacts of the $WB_4$, as given in block 108 of FIG. 1, which were then sintered, as given in block 110. Cold pressing followed by pressureless sintering of the compacts in hBN crucibles in an argon atmosphere was investigated, as well as spark plasma sintering (SPS) using graphite dies. For cold-pressing, the milled powders were mixed with a polyethylene glycol binder (DOW Carbowax, 8000 M.W.) and deionized water in a jar mill and then dried at about 60 C for about twelve hours. The mixtures were then passed through a 140-mesh sieve to agglomerate into a free-flowing powder. Hardened steel pressing dies of 25-mm or 60-mm diameter were filled and compacted at up to about 120 MPa. For SPS, the $WB_4$ milled powder was not mixed with a binder, but was compacted at about 50 MPa in a 25 mm diameter graphite die with a heating rate of about 100 C/min to a temperature of about 1800 C.

Samples from Trial 11 were compressed to a density of about 3.16 g/cm$^3$, and subjected to radiation testing. These samples produced an average dose reduction of about 17.5% of $^{60}Co$ gamma radiation, using direct measurement. The modeling of radiation transport through various shield geometries, using multiple neutron and gamma energy spectra was successfully completed, and showed the potential for more than 30% mass reductions in the Kilopower shield design using $WB_4$, assuming the same shielding effectiveness as current designs.

The foregoing description of embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A method of forming tungsten tetraboride, the method comprising the steps of:
combining tungsten and boron in a molar ratio of from about 1:6 to about 1:12, respectively, and
firing the combined tungsten and boron in a hexagonal boron nitride crucible at a temperature of from about 1600 C to about 2000 C, to form tungsten tetraboride wherein the tungsten and the boron are combined with carbon in the crucible.

2. The method of claim 1, wherein the molar ratio is one of about 1:9 or 1:6.

3. The method of claim 1, wherein the temperature is about 1800 C.

4. The method of claim 1, wherein the firing is accomplished at about one atmosphere.

5. The method of claim 1, wherein the firing is accomplished in an argon environment.

6. The method of claim 1, wherein the tungsten is provided as tungsten oxide.

7. The method of claim 1, wherein the boron is provided as boric acid.

8. The method of claim 1, wherein the tungsten is provided as tungsten metal.

9. The method of claim 1, wherein the boron is provided as boron metal.

10. The method of claim 1, wherein the boron is provided as $^{10}B$ enriched boron.

11. The method of claim 1, further comprising milling the tungsten tetraboride to a powder.

12. The method of claim 1, further comprising milling the tungsten tetraboride to a powder and compressing the powder into a desired shape.

13. The method of claim 1, further comprising milling the tungsten tetraboride to a powder, compressing the powder into a desired shape, and sintering the desired shape.

14. A method of forming tungsten tetraboride into a desired shape, the method comprising the steps of:
combining tungsten and boron in a molar ratio of from about 1:6 to about 1:12, respectively,
firing the combined tungsten and boron in a hexagonal boron nitride crucible at a temperature of from about 1600 C to about 2000 C, to form tungsten tetraboride,
milling the tungsten tetraboride to a powder,
compressing the powder into a desired shape, and
sintering the desired shape wherein the tungsten and the boron are combined with carbon in the crucible.

15. The method of claim 14, wherein the boron is provided as $^{10}B$ enriched boron.

16. The method of claim 14, wherein the firing is accomplished in one of an argon environment or a vacuum environment, and the sintering is accomplished using spark plasma sintering in one of an argon environment or a vacuum environment.

17. A method of forming tungsten tetraboride into a fission reactor shield, the method comprising the steps of:
combining tungsten and $^{10}B$ enriched boron in a molar ratio of from about 1:6 to about 1:12, respectively,
firing the combined tungsten and $^{10}B$ boron in a hexagonal boron nitride crucible at a temperature of from about 1600 C to about 2000 C, to form tungsten tetraboride,
milling the tungsten tetraboride to a powder,
compressing the powder into a desired shape of the fission reactor shield, and
sintering the fission reactor shield wherein the tungsten and the boron are combined with carbon in the crucible.

18. The method of claim 17, wherein the boron is provided as $^{10}B$ enriched boric acid.

19. The method of claim 17, wherein the firing is accomplished in one of an argon environment or a vacuum environment, and the sintering is accomplished using spark plasma sintering in one of an argon environment or a vacuum environment.

* * * * *